Patented July 2, 1929.

1,719,712

UNITED STATES PATENT OFFICE.

WILLIAM W. McLAURIN, OF BROOKFIELD, MASSACHUSETTS.

GUMMED PAPER AND PROCESS OF MANUFACTURING THE SAME.

No Drawing.   Application filed September 6, 1928. Serial No. 304,379.

This invention relates to gummed paper, cloth, and other sheet materials hereinafter, for convenience, referred to as "paper", and to processes of manufacturing material of this character.

It is frequently desirable to stick a label to an article having some unusual surface characteristics which prevents the firm adhesion of the label to the article. Important examples of such articles are metal parts which are coated with shellac or lacquer; also fruits and vegetables, more particularly oranges and grapefruit. Labels coated with the ordinary gums or adhesives do not adhere firmly to such articles. They stick very well so long as the glue is moist, but are very easily knocked off, and frequently will drop off as soon as the adhesive has become thoroughly dry.

The present invention deals with the problem presented by this condition, and it aims to devise a gummed paper, or the like, which will adhere permanently to surfaces of such a nature that the ordinary gummed labels do not stick to them permanently. It is also an object of the invention to devise an economical and thoroughly practical method of manufacturing such gummed paper.

I have found that if adhesives such as those ordinarily used in gumming paper, cloth and the like, are mixed with a suitable quantity of some hygroscopic material, the latter material will hold sufficient moisture to prevent the adhesive from becoming dried out to such an extent that it loses its adhesive properties. A composition which I have found entirely satisfactory for the coating of paper designed to be used in the manufacture of labels consists of 50% of a water soluble adhesive mixed with 50% of commercial glycerine, glucose or an inverted sugar. The adhesive may consist of an animal or fish glue, starch derivatives, such as dextrine, and the like. Other hygroscopic agents, (such, for example, as diethylene glycol) may be substituted for those named. If gum arabic is used as the adhesive, the hygroscopic material may consist of calcium or magnesium chloride. The nature and proportions of the ingredients used will depend on the service required, the expense involved an other practical considerations which will be obvious to those skilled in this art.

Such adhesive compounds may be spread on paper with the usual coating machinery. A strip of paper coated with such a mixture will adhere practically indefinitely to shellacked and lacquered surfaces, and also to the surfaces of oranges, grapefruit, and a great variety of fruits and vegetables. These mixtures are also superior for other purposes, as for instance, in the manufacture of sealing strips, stays and the like.

It will be observed that the ability of the glycerine glucose or other hygroscopic material used to hold water, and therefore keep the adhesive in a moist and tacky condition, makes the sheets coated with this material very difficult to handle prior to their actual attachment to the goods to which they are to be applied. It is impossible for sheet feeding mechanisms, such as those commonly used in printing machines, to handle sheets so coated under normal atmospheric conditions. It is necessary therefore to treat such coated papers in some manner that will render the adhesive coating hard and non-tacky under normal conditions.

I have found that this problem can be effectually solved by giving the adhesive coat a thin protective coating of some material which is hard and non-tacky under ordinary atmospheric conditions but which is readily soluble in water, or any other solvent which is to be used in rendering the adhesive coating tacky. Inasmuch as it is usually necessary to apply such a coating in the form of a solution, the material constituting the protective coat should also be soluble in some liquid that does not dissolve the adhesive coating, or in which, at least, the adhesive coating is soluble only with difficulty.

I have found that common hard soap forms an entirely satisfactory protective coating. A soap preferably is selected which has a relatively high melting point so that it will not soften at high atmospheric temperatures. Ordinary chip tallow soap is satisfactory for this purpose. In applying a coating of this material it is dissolved in alcohol, the soap being quite readily soluble in this liquid when hot, while the adhesive coating is practically insoluble in it.

According to the preferred process the adhesive coating of glue or its equivalent, and glycerine, glucose or the like, is applied to the paper with the usual coating machinery. The coated strip then passes over a drying drum which dries the coating on the strip in the usual manner, and then, while the adhesive coating is dry, the strip is run through another machine which applies to the adhesive surface a thin film of soap dissolved in alcohol. The alcohol evaporates very quickly, and such evaporation may be hastened by running the coated sheet over a drying drum.

The thin film of soap prevents the glycerine, glucose, or other hygroscopic material in the adhesive coating from taking up moisture from the atmosphere, and consequently, the coating remains hard and non-tacky and the coated strip may be handled with the same facility as ordinary gummed sheets and in the mechanisms commonly used for this purpose. As soon as the composite coating on the sheet is moistened with water, it immediately becomes tacky and thereafter the glycerine or other hygroscopic material will hold enough moisture to keep the coating in a tacky condition so that it effectively secures the sheet to the surface of any article to which it is applied.

While I have herein described the best forms of my invention that I have so far devised, it will be evident that other ingredients than those particularly mentioned and different proportions may be used, and that the process described may be modified in minor particulars without departing from the spirit or scope of the invention.

This application is a continuation in part of my pending application Serial No. 752,455, filed November 26, 1924. It differs from said pending application chiefly in naming a broader list of adhesives and a wider range of hygroscopic substances which may be used in this process.

Having thus described my invention, what I desire to claim as new is:

1. An article of the character described comprising a sheet of paper, a coating of a water soluble adhesive on one face of said sheet, and a coating of soap protecting said adhesive coating.

2. An article of the character described comprising a sheet of paper, a coating on one face of said sheet of a water soluble adhesive which is normally tacky, and a coating of soap protecting said adhesive coating, said protective coating being normally non-tacky but being soluble in water.

3. An article of the character described comprising a sheet of paper, an inner coating on said sheet of an adhesive material containing a sufficient proportion of a hygroscopic agent to keep said adhesive tacky under normal atmospheric conditions, and a thin outer coating of soap covering the surface of said inner coating, said outer coating being normally hard and non-tacky.

4. An article of the character described comprising a sheet of paper, a coating thereon of a water soluble adhesive containing a sufficient percentage of a hygroscopic agent to keep the coating tacky after it has once been moistened, and a protective coating of soap on said adhesive coating.

5. An article of the character described comprising a sheet of paper having on one side thereof a coating which is normally non-tacky but which becomes tacky when moistened with water and thereafter remains tacky for an indefinite period, and a protective coating of soap covering said adhesive coating.

6. An article of the character described comprising a sheet of paper, and two superposed coatings on one face of said sheet, the inner of said coatings consisting of a mixture of water soluble adhesive and a hygroscopic agent, and the outer of said coatings consisting of hard soap.

7. That improvement in the process of manufacturing gummed papers and the like, which consists in applying to the paper a coating of an adhesive material which is normally tacky, drying said coating and, while the coating is dry, covering it with a thin coating of soap.

8. That improvement in the process of manufacturing gummed papers and the like, which consists in applying to the paper a coating of an adhesive material which is normally tacky, drying said coating and, while the coating is dry, covering it with a thin coating of soap dissolved in a solvent which does not readily dissolve said adhesive coating.

9. That improvement in the process of manufacturing gummed papers and the like, which consists in applying to the paper a coating of an adhesive material which is normally tacky, drying said coating, and then covering said coating with a thin surface coating of hard soap dissolved in alcohol.

In testimony whereof I have hereunto signed this specification.

WILLIAM W. McLAURIN.

CERTIFICATE OF CORRECTION.

Patent No. 1,719,712.                                                 Granted July 2, 1929, to

WILLIAM W. McLAURIN.

It is hereby certified that error appears in the printed specification of the above numbered patent requiring correction as follows: Page 1, line 43, before the word "starch" insert the words "adhesive gums"; same page, line 51, for the article "an" read "and"; and that the said Letters Patent should be read with these corrections therein that the same may conform to the record of the case in the Patent Office.

Signed and sealed this 20th day of August, A. D. 1929.

(Seal)

M. J. Moore,
Acting Commissioner of Patents.